(12) United States Patent
Gabriel

(10) Patent No.: US 7,694,917 B2
(45) Date of Patent: Apr. 13, 2010

(54) CABLE ELEVATOR

(76) Inventor: Caelin Gabriel, 26273 Twelve Trees La., Suite D559, Poulsbo, WA (US) 98370

( * ) Notice: Subject to any disclaimer, the term of this patent is extended or adjusted under 35 U.S.C. 154(b) by 0 days.

(21) Appl. No.: 12/196,559

(22) Filed: Aug. 22, 2008

(65) Prior Publication Data

US 2009/0050753 A1  Feb. 26, 2009

Related U.S. Application Data

(60) Provisional application No. 60/957,226, filed on Aug. 22, 2007.

(51) Int. Cl.
*F16L 3/00* (2006.01)
(52) U.S. Cl. ............................................. 248/49
(58) Field of Classification Search ............ 248/49, 248/68.1, 62, 65, 80; 174/40 R, 45 R, 45 TD, 174/40 CC, 135
See application file for complete search history.

(56) References Cited

U.S. PATENT DOCUMENTS

| | | | |
|---|---|---|---|
| 4,360,177 A | 11/1982 | Dulhunty | |
| 4,899,963 A * | 2/1990 | Murphy | 248/65 |
| 5,014,941 A | 5/1991 | Sherman | |
| 5,435,507 A | 7/1995 | Murphy | |
| 5,950,968 A * | 9/1999 | Sato | 248/49 |
| 6,402,865 B1 * | 6/2002 | Handa et al. | 156/77 |
| 6,581,885 B2 | 6/2003 | Polad | |
| 6,669,151 B2 * | 12/2003 | Mascadri | 248/74.3 |
| 7,250,586 B2 * | 7/2007 | Diemer et al. | 219/217 |
| 7,441,731 B2 * | 10/2008 | Smart et al. | 248/74.1 |
| 2003/0087975 A1 * | 5/2003 | Bufanda et al. | 521/134 |
| 2007/0045482 A1 * | 3/2007 | Smart | 248/68.1 |
| 2007/0209133 A1 * | 9/2007 | Linzell | 15/209.1 |
| 2009/0090520 A1 * | 4/2009 | Lee | 169/16 |

* cited by examiner

*Primary Examiner*—Ramon O Ramirez
(74) *Attorney, Agent, or Firm*—Craig M. Stainbrook; Stainbrook & Stainbrook, LLP

(57) ABSTRACT

A cable support apparatus for suspending audio and/or video system cables above the floor. The device is configured as a sandwich of at least three layers of electrically conductive foam, including first and second outer layers fabricated from a low density electrically conductive foam, and an inner layer disposed between said first and second outer layers and fabricated from a foam having a higher density and greater rigidity than the foam of said first and second layers. The inner layer includes a V-shaped crotch for supporting a cable with minimal surface contact. The cable support minimizes floor vibrations transmitted to the cable, breaks up resonant vibration modes within the cable support itself, and neutralizes static-electrical charge differentials between the cable and the floor.

8 Claims, 2 Drawing Sheets

CABLE ELEVATOR

CROSS REFERENCES TO RELATED APPLICATIONS

The present application claims the benefit of the filing date of U.S. Provisional Patent Application 60/957,226, filed Aug. 22, 2007.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to cable support structures, and more specifically to a floor support for a power or signal cable.

2. Discussion of Related Art Including Information Disclosed Under 37 CFR §§1.97, 1.98

There are numerous products that elevate cables off a floor in electrical transmission and signal transmission systems. Most known cable elevation devices are used in connection with walls or vertical supports (e.g. towers) and comprise either very simple clamping apparatus for merely holding the cable above ground, or very elaborate clamping apparatus for damping vibration, dissipating electrostatic charges, protecting the cable from damage, and the like. Exemplary devices are shown in the following:

U.S. Pat. No. 6,581,885, to Polad, which teaches an adjustable, removable, strap used to bundle and hold electrical cables above the floor or counter top and includes a flexible strap with headed pins in a top end that may be disposed through mating holes in the bottom end when the strap is doubled back to create a closed loop.

U.S. Pat. No. 5,435,507, to Murphy, shows a cable support (for fiber optic cables strung between utility poles) that includes a contoured cradle for cushioning and spacing the supported cable, a clamp for securing the cable in the cradle, and a fastener and cleats for connecting to the pole. U.S. Pat. No. 5,014,941, to Sherman, discloses a device similar in principle, though slightly more elaborate design.

U.S. Pat. No. 4,360,177, to Dulhunty, teaches an early cable suspension clamp that comprises little more than a rigid cylindrical cradle element with cushioning material disposed on the inner surfaces for holding an electrical conductor, and opposing clamping tabs extending from a slit in the cradle.

Cable support devices are also known to be used in connection with high-end audio and video systems. These cable support products are typically made from a variety of materials including wood, plastics, metal and ceramics. The effectiveness of all of these products, to the knowledge of the present inventor, is claimed to result from reduced vibration from the floor and/or isolation of the cable from the static field of the floor.

BRIEF SUMMARY OF THE INVENTION

The audio/video cable elevation devices in the prior art are designed to isolate cables from the floor in an attempt to reduce the coupling of floor vibrations to the cable. As noted, such products are made from electrical insulators such as wood, plastics, glass and ceramics. However, elevating the cable from the floor with an electrical insulator creates a relative static charge differential between the cable and floor. Over a period of time this static differential can grow quite large—to several thousand electrical volts/meter. When electrical signals are sent through the cable, the signal may be distorted or inter-modulated by the relative electrical charge between the cable and floor. This effect would be similar to passing an electrical signal through a wire disposed within a powerful electromagnetic field.

The present invention differs from the prior art devices in that it is primarily designed to neutralize (make equal) the static differential charges associated with the floor and the cable while providing a superior level of isolation from floor-based vibration.

It is therefore an object of the present invention to provide a new and improved cable elevation device that improves the perceived quality of sound reproduction when played back through a high-end audio system.

It is a further object of the present invention to provide a cable elevator that improves the perceived video reproduction when played back through a high-resolution video system A still further object is to minimize the floor vibrations transmitted from the floor to the cable.

Yet another object is to break up resonant vibration modes within the cable elevator itself.

Another object is to neutralize static-electrical charge differentials between the cable and the floor.

The foregoing summary broadly sets out the more important features of the present invention so that the detailed description that follows may be better understood and so that the present contributions to the art may be better appreciated. There are additional features of the invention that will be described in the detailed description of the preferred embodiments of the invention which will form the subject matter of the claims in a non-provisional patent application filed subsequent to the instant application and claiming the benefit of the present filing date therein.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways. Those skilled in the art will appreciate that the conception, upon which this disclosure is based may readily be used as a basis for designing other structures, methods, and systems for carrying out the several purposes of the present invention. It is important, therefore, that such equivalent constructions are contemplated herein as far as they do not depart from the spirit and scope of the present invention.

For a better understanding of the present invention, its advantages and the specific objects attained by its uses, reference should be made to the accompanying drawings and descriptive matter in which there is illustrated the preferred embodiment.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
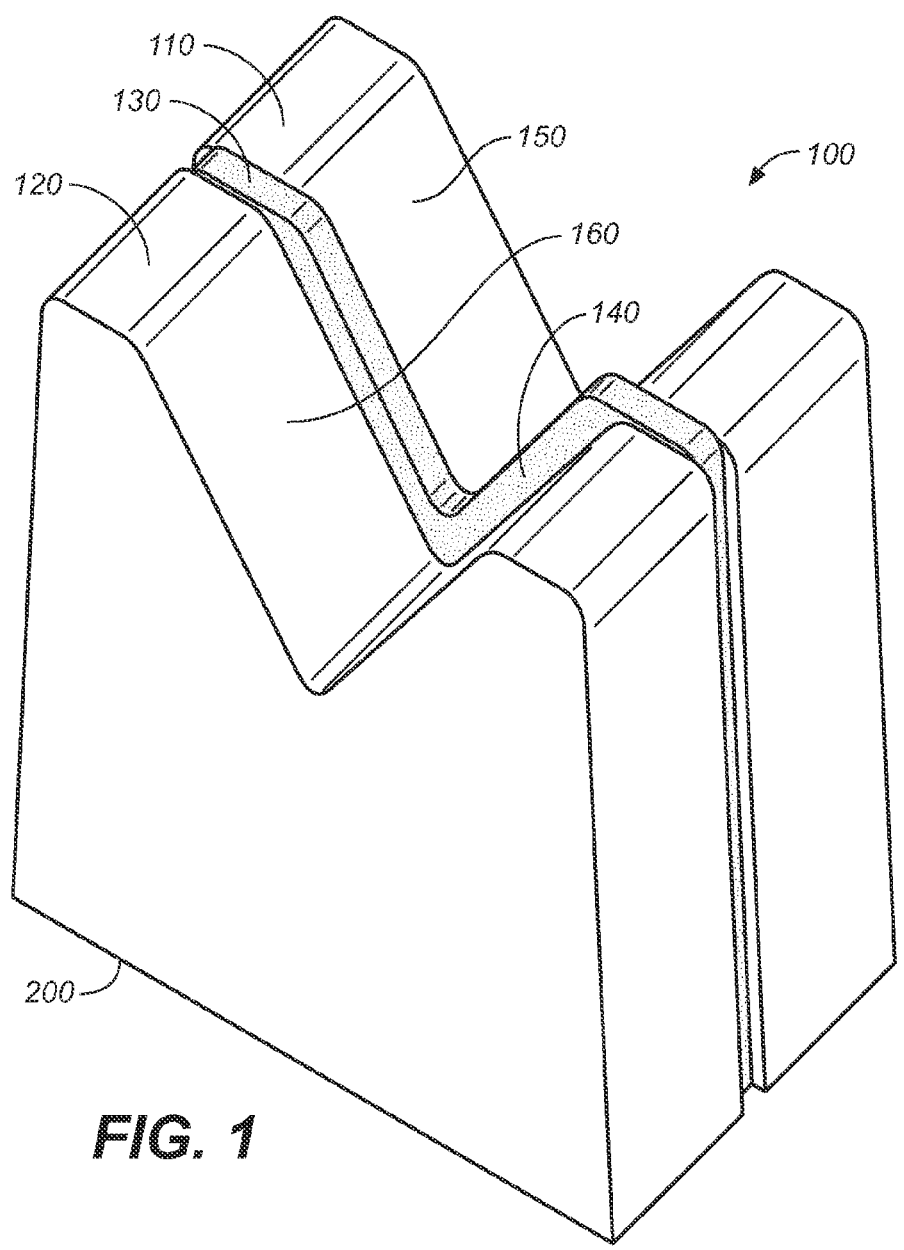
FIG. 1 is a perspective view of the cable elevator of the present invention.
Figure 2:
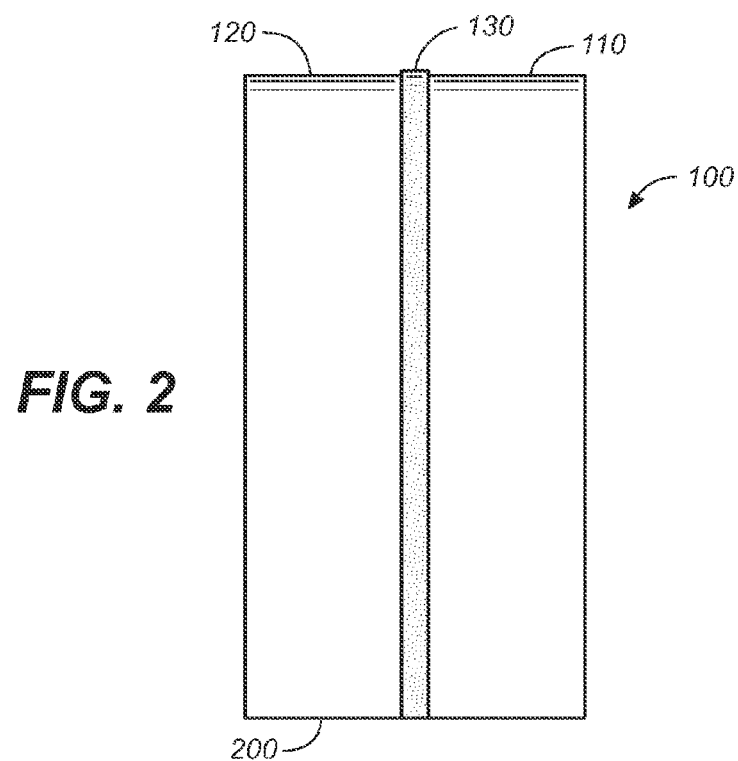
FIG. 2 is a side view in elevation thereof.
Figure 3:
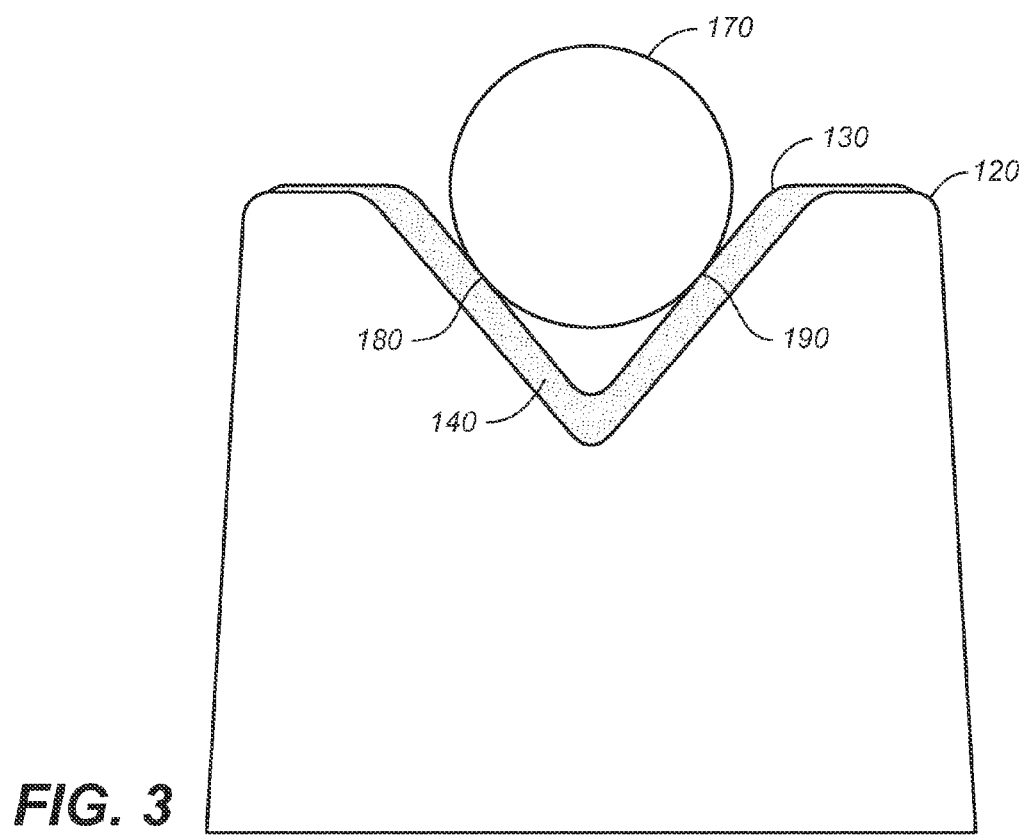
FIG. 3 is a front view showing a cable supported by the inventive cable elevation device.

Referring to FIGS. 1 through 3, wherein like reference numerals refer to like components in the various views, there is illustrated therein a new and improved dark field cable elevator, generally denominated 100 herein.

Collectively, the figures show that in a first preferred embodiment, the inventive cable elevator of the present invention comprises a sandwich of three layers of conductive foam, including first and second outer layers 110, 120, each fabricated from low density (soft) electrically conductive closed cell foam, and an inner layer 130 disposed between the first and second outer layers and fabricated from a high density rigid closed cell foam. The combination of these layers unify the static fields between the floor and a cable, such that the static charge on the floor and the cable are relatively equalized. The invention thereby provides the benefits of isolation from floor vibrations while providing a unified static field.

The closed cell foam of the outside layers is similar to the type that is used to protect large scale integrated circuits from static-electrical discharges and in a preferred embodiment includes the following material properties: Density=approximately 3.0 pcf: and electrical resistivity=approximately $10^4$ ohms. These outer layers make up the vast majority of the mass and volume of the cable elevator and provide an electrical path between the floor and the cable. Any static-electric charge differential that might exist between the floor and cable will tend to be neutralized or mitigated by the migration of electrical charge from one to the other.

The outer layers are made from soft conductive foam that provides good vibration dampening while allowing the static charge to propagate from floor to cable. The closed cell nature of the foam and relative low density tend to reduce the intensity of vibration through the material.

A primary objective of the invention is to decrease the transmission of vibration from floor to cable. Low-density (soft) foam tends to distort and conform itself to the shape of a heavy cable that may be placed on it. This is disadvantageous to minimizing vibration transmission, as such conformation increases the contact area between the cable and the elevator.

One of the objectives of the present invention is to minimize the contact area between the elevator and the cable, as a minimal contact area decreases the degree and intensity of vibration transmission. Accordingly, a second type of high-density (rigid) foam is sandwiched between the outer layers and is used for an inner layer in the cable elevator of the present invention.

The interior closed cell foam layer 130 is made from a relatively dense and stiff type of foam, such as POLY-PLANK® #9, manufactured by Pactiv Corporation. This layer serves several purposes. It provides a very rigid support for the cable. It does not substantially deform or distort under the weight of a heavy cable. Due to its high-density, only a thin section (⅛ inch) is required to support the cable. Further, the upper portion of this relatively stiff layer is formed in the shape of a V, which includes a crotch portion 140 that extends above the crotch portions 150, 160 of the outer layers. The composition, size, and shape of the inner foam layer ensure that the inner layer contacts a cylindrical cable 170 at only two points 180, 190, which are tangents to the circumference of the cable, thus minimizing the contact area between cable and elevator. This further decreases the transmission of vibration through the elevator. [POLYPLANK is a registered trademark of Pactiv Corporation, Lake Forest, Ill.]

The high-density (rigid) inner layer serves a secondary benefit. Any and all substances have a resonant frequency. While the resonant frequency of the low-density foam is relatively low the resonant frequency of the high-density rigid foam will be relatively higher. By sandwiching the high-density foam within the low-density foam, any resonant frequency modes of the low-density foam will tend to be broken up and diffracted. This further enhances the desired reduction of vibration transmission through the elevator.

The cable elevator of the present invention can be manufactured in a number of suitable sizes and shapes. The illustrated embodiment shows the apparatus having a generally planar bottom side 200 for resting flat on a floor, and this portion of the device would carry over into virtually any other overall shape chosen for the elevator, as will the V-shape of the crotch portions of the sandwich layers. Material costs, aesthetic considerations (if applicable), material properties, and such obvious elements will factor into the choice of the general configuration for the apparatus. The preferred embodiment is simply exemplary of a functional shape that nicely cooperates with the functional elements of securely supporting a cable above a floor while providing a means to dissipate vibrations and dissipate differential static charges as they accumulate.

The cable support of the present invention can include additional layers of foam of various densities to further improve the diffraction of internal resonant vibration modes. In a very simple embodiment, it may also be constructed of a single type of foam (conductive foam), but such a construction would tend to deform under the weight of a cable, thus increasing the contact patch (area of contact) between the cable and the cable elevator, thereby increasing the transmission of vibration to the cable. Thus, such a design choice is inferior to the preferred embodiment described and illustrated herein.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components,

What is claimed as invention is:

1. A cable support for a power or signal cable, comprising:
a sandwich of at least three layers of electrically conductive foam, including first and second outer layers fabricated from a low density electrically conductive foam, and an inner layer disposed between said first and second outer layers and fabricated from a foam having a higher density and greater rigidity than the foam of said first and second layers;
wherein when said outer layers and said inner layer are configured with a floor engaging portion and a V-shaped cable support portion to support and elevate a power or signal cable above the floor, and further wherein said outer layers comprise the majority of the mass of the floor support and are fabricated from a material having a density and electrical resistivity sufficient to substantially equalize differential static charges between the floor and the cable while decreasing the transmission of vibration from the floor to the cable.

2. The cable support of claim 1, wherein said first and second outer layers are fabricated from closed cell foam.

3. The cable support of claim 1, wherein said inner layer is fabricated from closed cell foam.

4. The cable support of claim 1, wherein said outer layers include a V-shaped crotch portion, and said inner layer includes a V-shaped crotch portion that extends above said V-shaped crotch portion of said outer layers.

5. The cable support of claim 1, wherein said first and second outer layers combine to isolate floor vibrations from a cable supported on said inner layer.

6. The cable support of claim 1, wherein said electrically conductive foam has a density of 3.0 pcf and an electrical resistivity of about $10^4$ ohms.

7. The cable support of claim 6, wherein said inner layer is rigid relative to said first and second outer layers and provides a V-shaped support cradle for a cable, whereby a cable disposed in said support cradle touches said cradle at two tangents to the circumference of the cable.

8. The cable support of claim 1, including at least one more outer layer.

* * * * *